United States Patent
Berretta et al.

(10) Patent No.: US 9,250,960 B2
(45) Date of Patent: Feb. 2, 2016

(54) PLANNING EXECUTION OF TASKS WITH DEPENDENCY RESOLUTION

(71) Applicant: International Business Machines Corporation, Armonk, NY (US)

(72) Inventors: Katiuscia Berretta, Rome (IT); Francesca Curzi, Rome (IT); Rossella Donadeo, Rome (IT); Giuseppe Longobardi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 14/283,422

(22) Filed: May 21, 2014

(65) Prior Publication Data

US 2014/0366037 A1      Dec. 11, 2014

(30) Foreign Application Priority Data

Jun. 7, 2013   (IT) .............................. MI2013A0942

(51) Int. Cl.
  G06F 9/48   (2006.01)
  G06F 9/38   (2006.01)
  G06F 9/50   (2006.01)

(52) U.S. Cl.
  CPC ............ *G06F 9/4881* (2013.01); *G06F 9/3836* (2013.01); *G06F 9/5038* (2013.01); *G06F 2209/484* (2013.01)

(58) Field of Classification Search
  None
  See application file for complete search history.

(56) References Cited

U.S. PATENT DOCUMENTS

| | | | |
|---|---|---|---|
| 7,661,090 B2 | 2/2010 | Schmidt et al. | |
| 8,296,170 B2 | 10/2012 | O'Brien et al. | |
| 8,392,397 B2 | 3/2013 | Davis, II et al. | |
| 8,555,281 B1 * | 10/2013 | van Dijk | G06F 9/4881 718/100 |
| 2005/0149927 A1 | 7/2005 | Abe | |
| 2009/0013322 A1 | 1/2009 | Maclay | |
| 2009/0241117 A1 | 9/2009 | Dasgupta et al. | |
| 2011/0246998 A1 | 10/2011 | Vaidya et al. | |
| 2012/0084789 A1 | 4/2012 | Iorio | |

OTHER PUBLICATIONS

Decker et al., "Heuristic Scheduling of Grid Workflows Supporting Co-Allocation and Advance Reservation," Proceedings of the Seventh IEEE International Symposium on Cluster Computing and the Grid (CCGRID 2007), May 2007, pp. 335-342.
Henzinger et al., "Scheduling Large Jobs by Abstraction Refinement," Proceedings of the Sixth Conference on Computer Systems (EuroSys'11), Apr. 2011, pp. 329-342.

(Continued)

*Primary Examiner* — Qing Wu
(74) *Attorney, Agent, or Firm* — Yee & Associates, P.C.; Joseph Petrokaitis

(57) ABSTRACT

A computer-implemented method, program product and system for planning execution of a plurality of tasks according to a plurality of dependencies includes receiving an indication of a task type and execution time, ordering the tasks into a task list according to a primary ordering criterion, receiving an indication of a dependency type for the task type and an indication of a dependency time for the execution time of a predecessor one of the tasks, ordering the dependencies into a dependency list according to the primary ordering criterion, scanning the dependency list for resolving each current one of the dependencies, identifying the predecessor task as a current one of the tasks having the task type meeting the dependency type and the execution time meeting the dependency time, and planning the execution of the tasks according to the resolved dependencies.

12 Claims, 7 Drawing Sheets

(56) References Cited

OTHER PUBLICATIONS

Jensen et al., "Optimal Task Graph Scheduling with Binary Decision Diagrams," Department of Computer Science, Aalborg University, May 2004, 15 pages.

Singh et al., "Optimizing Grid-Based Workflow Execution," Journal of Grid Computing, vol. 3, No. 3-4, Sep. 2005, pp. 201-219.

IBM Corporation, "Dependencies," IBM Tivoli Workload Automation, Version 8.6, copyright 1993, 2012, 3 pages. Accessed Apr. 21, 2014, http://publib.boulder.ibm.com/infocenter/tivihelp/v47r1/index.jsp?topic=%2Fcom.ibm.tivoli.itws.doc_8.6.0.2%2Fdistr%2Fsrc_tsweb%2FGeneral_Help%2Fdependencies.htm.

* cited by examiner

PLANNING EXECUTION OF TASKS WITH DEPENDENCY RESOLUTION

This application is a counterpart of and claims the benefit of priority to Italian Patent Application No. MI2013A000942, filing date Jun. 7, 2013, the contents of which are hereby incorporated by reference.

TECHNICAL FIELD

The present disclosure relates to the data-processing field. More specifically, this disclosure relates to the planning of the execution of tasks.

BACKGROUND

Planning execution of different tasks (i.e., the control of their flow over time in order to achieve a desired object) is a commonplace activity in a number of applications. A typical example is a workload scheduler, or simply scheduler, which is used in a data-processing system to control the execution of large quantities of data-processing jobs, or simply jobs (i.e., any work unit suitable to be executed thereon).

For this purpose, the scheduler creates a workload plan, or simply a plan (establishing the flow of execution of the jobs); particularly, the plan is created by arranging the jobs in succession according to a desired execution time thereof.

The execution of some jobs may also be constrained by one or more dependencies on other jobs (for example, when the jobs process the results of the other jobs). Generally, each dependency indicates a job (referred to as predecessor job), whose execution enables the execution of another job (referred to as successor job). Moreover, the dependency may also indicate a dependency time (for example, a dependency timeframe), which further requires that the execution time of the predecessor job meets the dependency timeframe to enable the execution of the successor job (for example, when the execution time of the predecessor job falls within the dependency timeframe); the dependency timeframe may be specified either in absolute terms (for example, a fixed time interval) or in relative terms with respect to the execution time of the successor job (for example, a time interval around it).

The plan may comprise the execution of multiple instances of some jobs of the same type. Therefore, each dependency is to be resolved by identifying the actual predecessor job to be linked to the successor job, by selecting it among all the eligible jobs of the required type having the execution time within the dependency timeframe. The selection of the predecessor job is performed according to pre-defined rules. For example, the predecessor job may be selected so as to have the execution time that is closest to the execution time of the successor job before it (comprised when they are the same); if this is not possible, the predecessor job is selected so as to have the execution time that is closest to the execution time of the successor job after it.

The resolution of each dependency then involves the searching of the corresponding predecessor job throughout all the jobs (for example, in the plan when a new job is to be added thereto). However, this requires several scanning of the jobs backwards and forwards. Therefore, the resolution of the dependencies may become quite long, especially when a very high number of jobs are to be executed (for example, several thousands in complex production environments), with a corresponding increase of the time required for creating the plan. All of the above has a detrimental effect on the performance of the scheduler, and then of the whole data-processing system.

Several techniques have been proposed in the art for improving the performance of a scheduler, for example, as disclosed in the following documents (the entire disclosures of which are herein incorporated by reference).

Particularly, U.S. Pat. No. 8,392,397 discloses a selection of provenance dependency function, US-A-2011/0246998 discloses a reorganization of tasks to achieve optimization of resources, US-A-2009/0241117 discloses an integration of flow orchestration and scheduling, US-A-2012/0084789 discloses an aggregation topology for optimizing task graphs, U.S. Pat. No. 7,661,090 discloses an optimization of operation sequence to allow manual operations to be combined when feasible, US-A-2009/0013322 discloses a scheduler allowing task overruns, US-A-2005/0149927 discloses a determination of executability of tasks based on required resource amount, U.S. Pat. No. 8,296,170 discloses a management of deadlines for completing activities, and "Optimizing Grid-Based Workflow Execution by Gurmeet Singh, Carl Kesselman and Ewa Deelman, Journal of Grid Computing (2006)" discloses an application of abstraction refinement to large-scale static scheduling problem.

However, the planning techniques known in the art are not completely satisfactory, especially with respect to the resolution of the dependencies.

SUMMARY

A simplified summary of the present disclosure is herein presented in order to provide a basic understanding thereof; however, the sole purpose of this summary is of introducing some concepts of the disclosure in a simplified form as a prelude to its following more detailed description, and it is not to be interpreted as an identification of its key elements nor as a delineation of its scope.

In general terms, the present disclosure is based on the idea of ordering the tasks and the dependencies for their scanning in a similar way.

Particularly, one or more aspects of the present disclosure are set out in the independent claims and advantageous features thereof are set out in the dependent claims, with the wording of all the claims that is herein incorporated verbatim by reference (with any advantageous feature provided with reference to a specific aspect that applies mutatis mutandis to every other aspect).

More specifically, an aspect provides a computer-implemented method for planning execution of a plurality of tasks according to a plurality of dependencies, wherein the tasks and the dependencies are ordered according to the same ordering criteria (based on type and time, respectively), and the ordered dependencies are scanned for resolving each current one of the dependency by scanning the ordered tasks.

A further aspect provides a corresponding computer program (and a corresponding computer program product).

A further aspect provides a corresponding system.

BRIEF DESCRIPTION OF THE DRAWINGS

The solution of the present disclosure, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
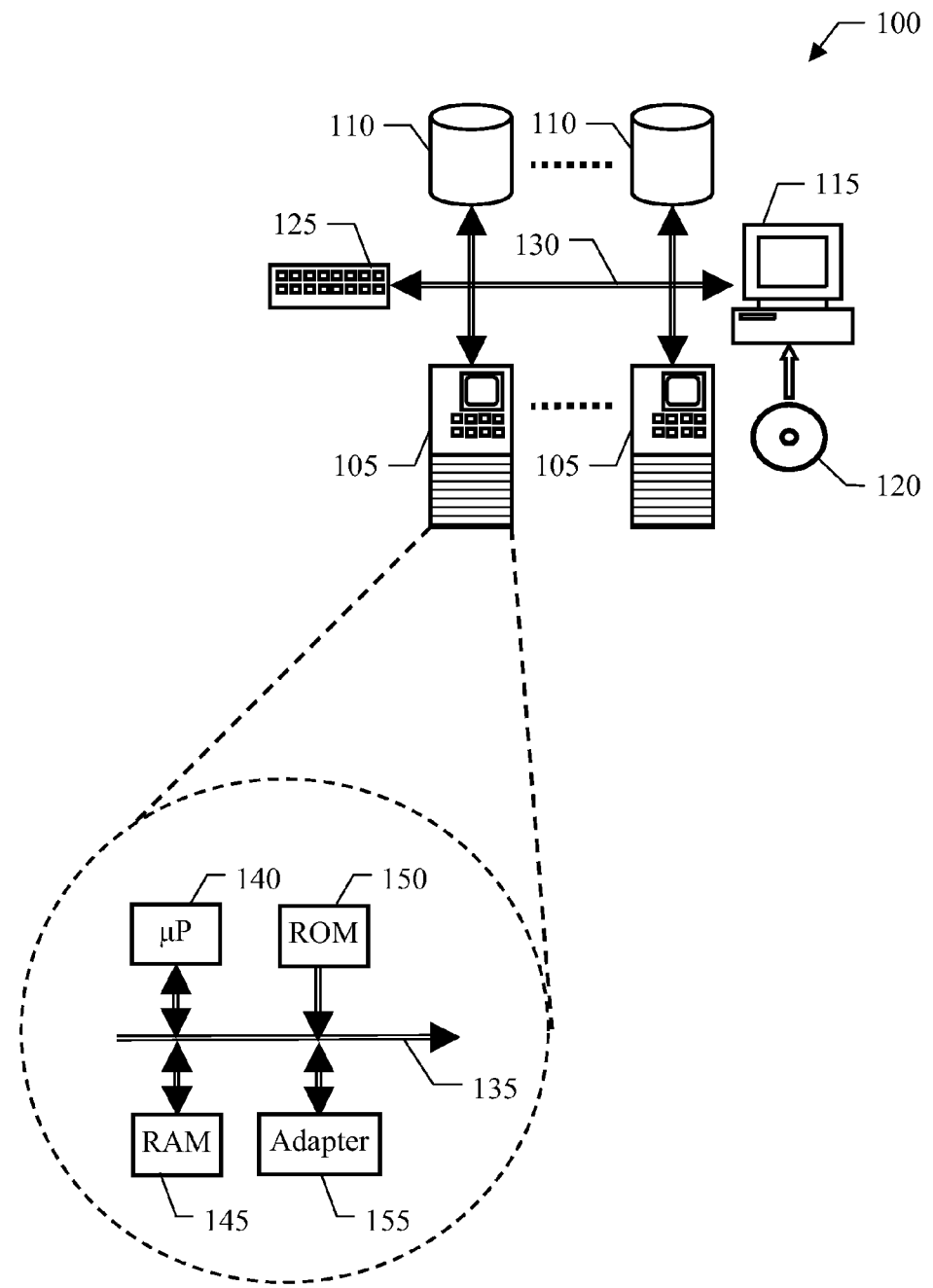
FIG. 1 shows a block-diagram of a data-processing system wherein the solution according to an embodiment of the present disclosure may be applied.

With reference in particular to the FIG. 1, a block-diagram is shown of a data-processing system 100 wherein the solution according to an embodiment of the present disclosure may be applied.

Particularly, the data-processing system 100 is a server farm that comprises several server computing machines, or simply servers, 105 (for example, of the rack or blade type) and storage disks 110 (for example, of the RAID type); the server farm 100 also comprises a console 115 for controlling the servers 105 and the disks 110 (for example, a personal computer), which console 115 is also provided with a drive for reading/writing removable storage devices 120 (for example, optical disks). A switch/router unit 125 manages communications among the servers 105, the disks 110 and the console 115, and with an external network (not shown in the figure); for this purposes, the servers 105, the disks 110 and the console 115 are connected to the switch/router unit 125 through a cabling structure 130.

Each server 105 is formed by several units that are connected in parallel to a bus structure 135. In detail, a set of one or more microprocessors 140 controls operation of the server 105; a RAM 145 is directly used as a working memory by the microprocessors 140, and a ROM 150 stores basic code for a bootstrap of the sever 105. Moreover, the server 105 comprises a network adapter 155, which is used to connect the server 105 to the cabling structure 130.

A specific server 105 (or more) operates as a control server, which is used to control the execution of (data-processing) jobs on (one or more) other servers 105, referred to as execution servers; this is implemented by a (workload) scheduler, which creates a (workload) plan establishing the flow of execution of the jobs. The jobs to be executed on the execution servers 105 are instances of a corresponding job type, for example, identified by a job name thereof. The planning of the execution of the jobs is mainly based on an execution time of each job, which indicates when the job is expected to be executed. The execution of some jobs may also be constrained by one or more dependencies. In the context of the present disclosure, the dependencies of interest are the ones based on the execution of other jobs. These dependencies may be generally reduced to a basic form, wherein each dependency is expressed by a dependency name for the job name and a dependency time for the execution time of a job (referred to as predecessor job) enabling the execution of another job (referred to as successor job). In order to plan the execution of the jobs, each dependency is to be resolved by identifying the actual predecessor job to be linked to the successor job; for this purpose, the predecessor job is searched among all the jobs, as the one having the job name meeting the dependency name (for example, when the job name is equal to the dependency name) and the execution time meeting the dependency time (for example, when the execution time falls within a corresponding timeframe, referred to as dependency timeframe).

Figure 2:
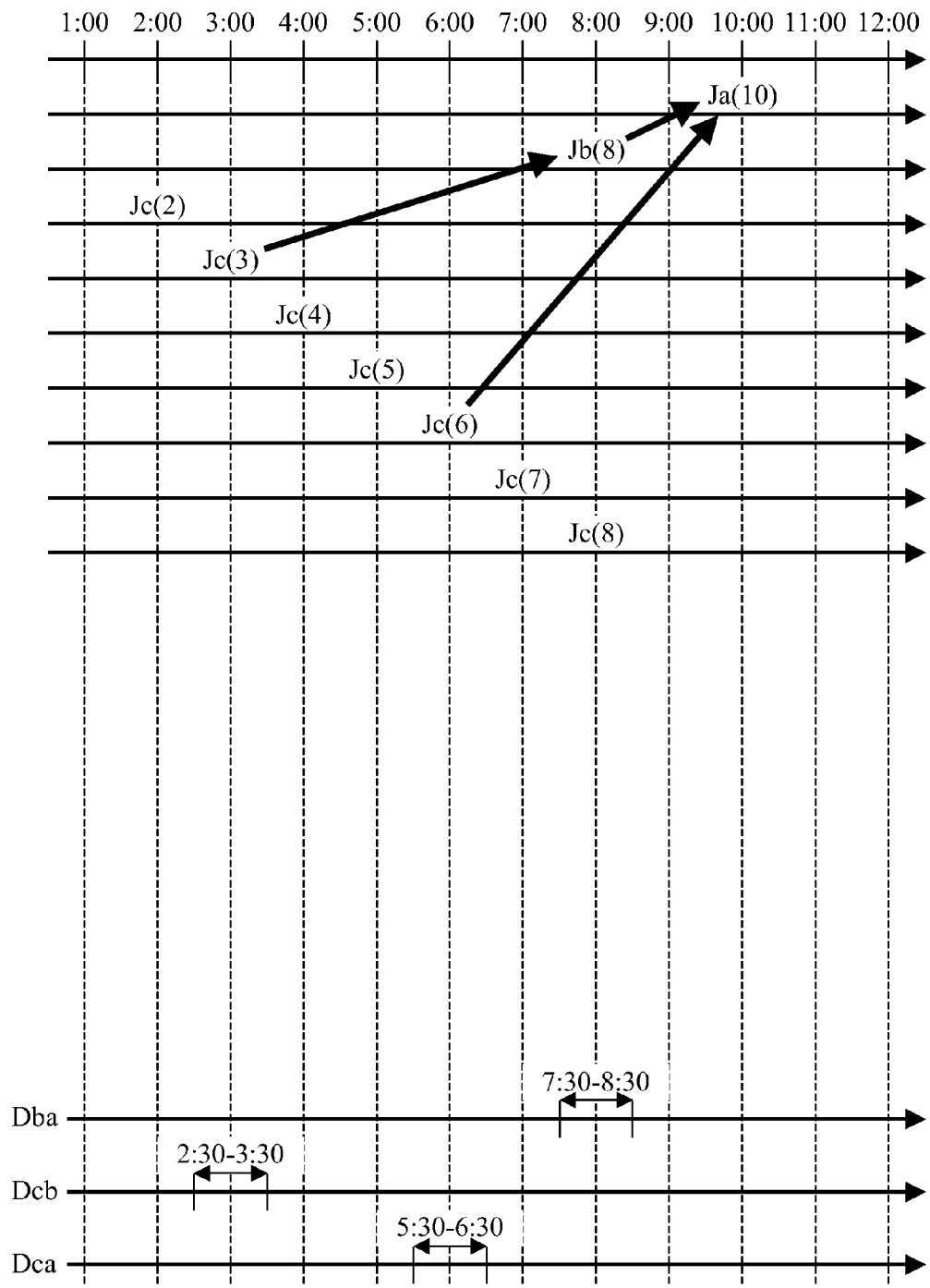
FIG. 2 shows a pictorial representation of an exemplary application of the solution according to an embodiment of the present disclosure.

With reference now to the FIG. 2, a pictorial representation is shown of an exemplary application of the solution according to an embodiment of the present disclosure.

In this case, a number of jobs are to be executed (for example, during a day); each job is identified by the corresponding job name, followed by the hour of its execution time in parentheses. Particularly, a job having the job name Ja should be executed at 10:00 (i.e., Ja(10)), a job having the job name Jb should be executed at 8:00 (i.e., Jb(8)), and a job having the job name Jc should be executed every hour from 2:00 to 8:00 (i.e., Jc(2)-Jc(8)).

A dependency Dba indicates that the execution of a predecessor job having the dependency name Jb in the dependency timeframe 7:30-8:30 is required to enable the execution of the successor job Ja(10), a dependency Dcb indicates that the execution of a predecessor job having the dependency name Jc in the dependency timeframe 2:30-3:30 is required to enable the execution of the successor job Jb(8), and a dependency Dca indicates that the execution of a predecessor job having the dependency name Jc in the dependency timeframe 5:30-6:30 is required to enable the execution of the successor job Ja(10). These dependencies are to be resolved (by identifying the actual predecessor job to be linked to the successor job of each one of them) for planning the execution of the above-mentioned jobs.

For this purpose, in the solution according to an embodiment of the present disclosure, the jobs are ordered, or sorted, into a job list (from the top to the bottom in the figure). For this purpose, the jobs are ordered according to a primary ordering criterion (for example, in alphabetic order), which is based on the job name (i.e., their ordering or sorting key); for the same job name, the jobs are then ordered according to a secondary ordering criterion (for example, in ascending order of time), which is based on the execution time. Likewise, the dependencies are ordered into a dependency list (again from the top to the bottom in the figure). As above, the dependencies are ordered according to the same primary ordering criterion that is now based on the dependency name; for the same dependency name, the dependencies are then ordered according to the same secondary ordering criterion that is now based on the dependency timeframe. For example, the secondary ordering criterion for ordering the dependencies is based on an end time of the dependency timeframe, and then on a start time thereof subordinately to the end time.

The dependency list is scanned starting from its beginning (i.e., the dependency Dba), in an attempt to resolve each (current) dependency. For this purpose, the job list is scanned for identifying the predecessor job to be linked to the successor job; the predecessor job is set equal to a (current) job that has the task type equal to the dependency type and the execution time within the dependency timeframe. The scanning of the job list starts from its beginning (i.e., the first job Ja(10)) for the first dependency Dba, and it starts from a point that was reached for the previous dependency otherwise.

Particularly, for the dependency Dba the job list is scanned starting from the job Ja(10) until reaching the job Jb(8) (having the job name equal to the dependency name Jb and the execution time 8:00 within the dependency timeframe 7:30-8:30), which is identified as the predecessor job for the successor job Ja(10), as indicated by a corresponding arrow in the figure. Passing to the dependency Dcb, the job list is scanned starting from the job Jb(8) until reaching the job Jc(3) (having the job name equal to the dependency name Jc and the execution time 3:00 within the dependency timeframe 2:30-3:30), which is identified as the predecessor job for the successor job Jb(8), as indicated by a corresponding arrow in the figure. At the end, for the dependency Dca the job list is scanned starting from the job Jc(3) until reaching the job Jc(6) (having the job name equal to the dependency name Jc and the execution time 6:00 within the dependency timeframe 5:30-6:30), which is identified as the predecessor job for the successor job Ja(10), as indicated by a corresponding arrow in the figure.

The above-described technique substantially limits the scanning of the jobs (for searching the predecessor jobs of the dependencies). Therefore, the resolution of the dependencies becomes shorter (especially when a very high number of jobs are to be executed), with a corresponding reduction of the time required for creating the plan. All of the above has a beneficial effect on the performance of the scheduler, and then of the whole data-processing system.

Figure 3:
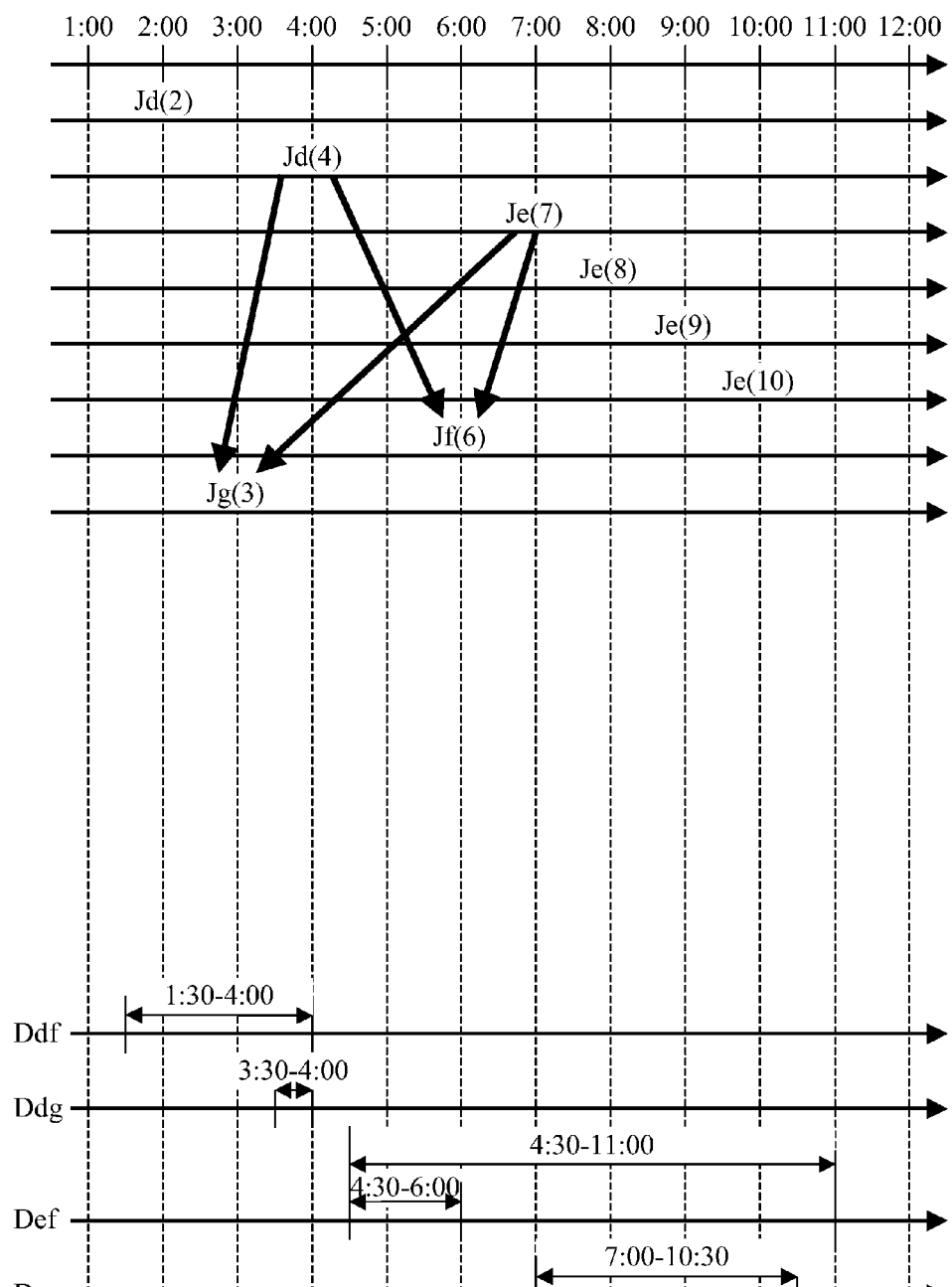
FIG. 3 shows a pictorial representation of an exemplary application of the solution according to a further embodiment of the present disclosure.

With reference now to the FIG. 3, a pictorial representation is shown of an exemplary application of the solution according to a further embodiment of the present disclosure.

In this case, a job having the job name Jd should be executed twice at 2:00 and at 4:00 (i.e., Jd(2),Jd(4)), a job having the job name Je should be executed every hour from 7:00 to 10:00 (i.e., Je(7)-Je(10)), a job having the job name Jf should be executed at 6:00 (i.e., Jf(6)), and a job having the job name Jg should be executed at 3:00 (i.e., Jg(3)).

A dependency Ddf indicates that the execution of a predecessor job having the dependency name Jd in the dependency timeframe 1:30-4:00 is required to enable the execution of the successor job Jf(6), a dependency Ddg indicates that the execution of a predecessor job having the dependency name Jd in the dependency timeframe 3:30-4:00 is required to enable the execution of the successor job Jg(3), a dependency Def indicates that the execution of a predecessor job having the dependency name Je in the dependency timeframe 4:30-11:00 is required to enable the execution of the successor job Jf(6), and a dependency Deg indicates that the execution of a predecessor job having the dependency name Je in the dependency timeframe 7:00-10:30 is required to enable the execution of the successor job Jg(3).

In this embodiment of the present disclosure, the dependency list and the job list are scanned twice. A first (look-backward) scanning is performed for searching the predecessor job of each dependency whose execution time is before, i.e., it does not follow (<=), the execution time of the successor job; a second (look-forward) scanning is instead performed for searching the predecessor job of each dependency being not resolved during the look-backward scanning, whose execution time is strictly after (>) the execution time of the successor job. For this purpose, a backward time is defined from the dependency time of each dependency (for example, a backward timeframe from the corresponding dependency timeframe). The backward time is set equal to the dependency time when the execution time of the successor job does not meet the dependency time, for example, it does not fall within the dependency timeframe (i.e., for the dependencies Ddf, Ddg and Deg); the backward time is instead set equal to the dependency time being restricted according to the execution time of the successor job otherwise, for example, by setting the start time of the backward timeframe equal to the start time of the dependency timeframe and the end time of the backward timeframe equal to the execution time of the successor job when it falls within the dependency timeframe (i.e., 4:30-6:30 for the dependency Def). The backward times are then used (instead of the dependency times) to order the dependencies and to search the predecessor jobs during the look-forward scanning (so that the dependency Def now precedes the dependency Deg in the example at issue). In this way, the jobs whose execution time is after the execution time of the successor job of each dependency are disregarded for searching the corresponding predecessor job in this phase.

As a further improvement, during both the (look-backward and look-forward) scanning the predecessor job of each dependency is selected so that its execution time is closest to the execution time of the successor job (when multiple eligible jobs, having the job name equal to the dependency name and the execution time within the dependency timeframe, are available). Therefore, during the look-backward scanning the last eligible job being found is selected, whereas during the look-forward scanning the first eligible job being found is selected.

More specifically, considering at first the look-backward scanning, as above the dependency list is scanned starting from its beginning (i.e., the dependency Ddf), in an attempt to resolve each dependency only with the tasks having the execution time before the execution time of the successor job. For this purpose, the job list is scanned for identifying the predecessor job to be linked to the successor job; the predecessor job is set equal to the job that has the task type equal to the dependency type and the execution time within the backward timeframe, whose execution time is closest to the execution time of the successor job before it (i.e., the last eligible job being found); the scanning of the job list again starts from its beginning (i.e., the first job Jd(2)) for the first dependency Ddf, and it starts from a point that was reached for the previous dependency otherwise.

Particularly, for the dependency Ddf the job list is scanned starting from the job Jd(2) until reaching the job Jd(4) (i.e., the last one having the job name equal to the dependency name Jd and the execution time 4:00 within the backward timeframe 1:30-4:00 before the execution time of the successor job 6:00), which is identified as the predecessor job for the successor job Jf(6), as indicated by a corresponding arrow in the figure. The dependency Ddg, instead, cannot be resolved in this phase, since no job may be found having the job name equal to the dependency name Jd and the execution time within the backward timeframe 3:30-4:00 before the execution time of the successor job 3:00. The dependency Def as well cannot be resolved in this phase, since no job may be found having the job name equal to the dependency name Je and the execution time within the backward timeframe 4:30-6:00 before the execution time of the successor job 6:00. Likewise, the dependency Deg cannot be resolved in this phase, since no job may be found having the job name equal to the dependency name Je and the execution time in the backward timeframe 7:00-10:30 before the execution time of the successor job 3:00.

Considering now the look-forward scanning, the dependency list is scanned again starting from its beginning, in an attempt to resolve each dependency that has not been resolved during the look-backward scanning (now with the tasks having the execution time after the execution time of the successor job). For this purpose, the job list is again scanned for identifying the predecessor job to be linked to the successor job; however, in this case the predecessor job is set equal to the job that has the task type equal to the dependency type and the execution time within the dependency timeframe, whose execution time is closest to the execution time of the successor job after it (i.e., the first eligible job being found); as above, the scanning of the job list starts from its beginning for the first dependency Ddf, and it starts from a point that was reached for the previous dependency otherwise.

Particularly, for the dependency Ddg the job list is scanned starting from the job Jd(2) until reaching the job Jd(4) (i.e., the first one having the job name equal to the dependency name Jd and the execution time 4:00 within the dependency timeframe 3:30-4:00), which is identified as the predecessor job for the successor job Jg(3), as indicated by a corresponding arrow in the figure. Moreover, for the dependency Def the job list is scanned starting from the job Jd(4) until reaching the job Je(7) (i.e., the first one having the job name equal to the dependency name Je and the execution time 7:00 within the dependency timeframe 4:30-11:00), which is identified as the predecessor job for the successor job Jf(6), as indicated by a corresponding arrow in the figure. At the end, for the dependency Deg the scanning of the job list starts from the job Je(7) and it stops immediately (since the job Je(7) already has the job name equal to the dependency name Je and the execution time 7:00 within the dependency timeframe 7:00-10:30), so that it is identified as the predecessor job for the successor job Jg(3) as well, as indicated by a corresponding arrow in the figure.

Figure 4:
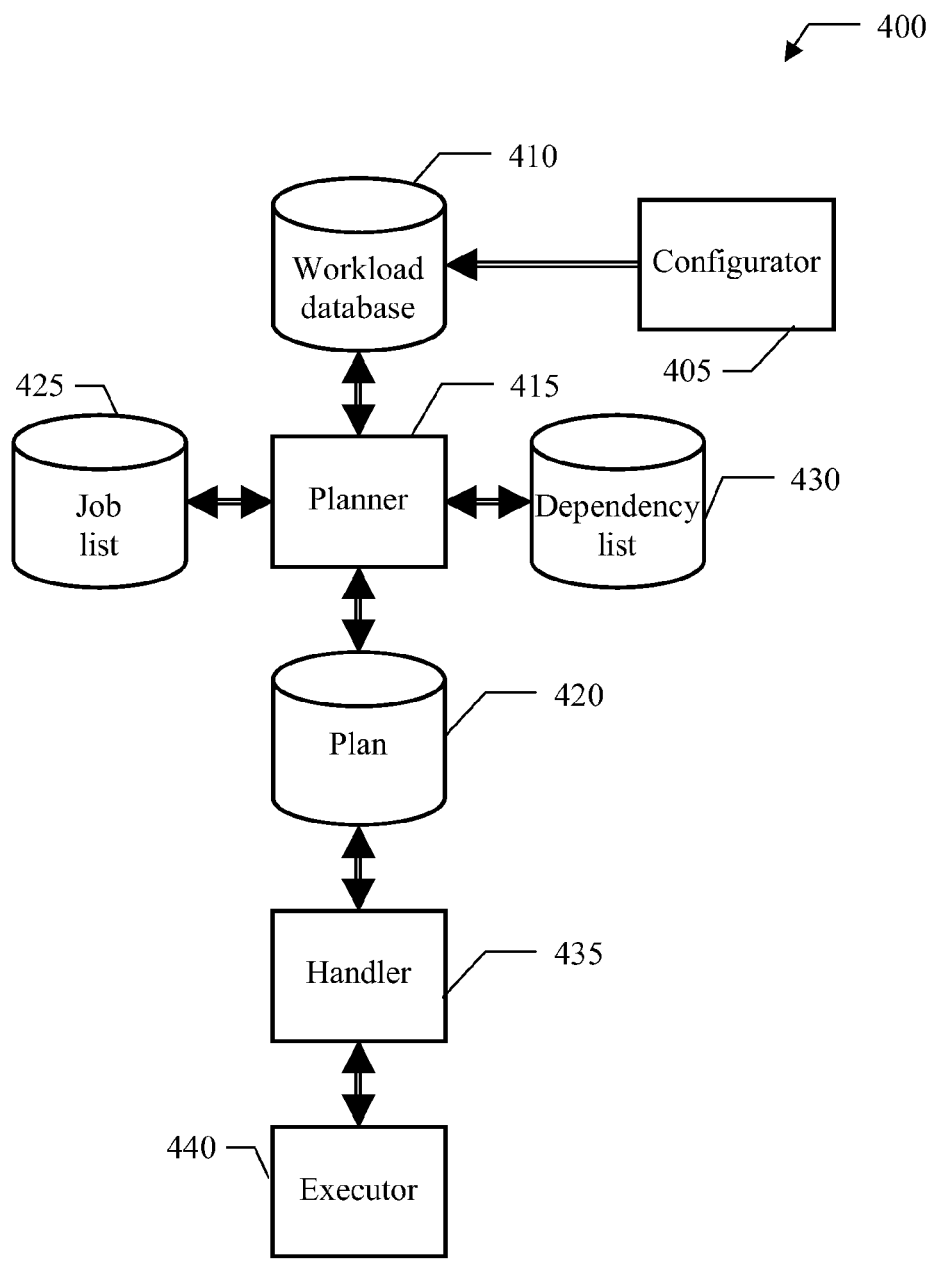
FIG. 4 shows the main software components that may be used to implement the solution according to an embodiment of the present disclosure.

With reference now to the FIG. 4, the main software components are shown that may be used to implement the solution according to an embodiment of the present disclosure.

Particularly, the software components are typically stored in the mass memory and loaded (at least partially) into the working memory of the control server when the programs are running, together with an operating system (not shown in the figure). The programs are initially installed onto the mass memory, for example, from removable storage devices or from the network. In this respect, each software component may represent a module, segment or portion of code, which comprises one or more executable instructions for implementing the specified logical function.

In detail, a scheduler 400 (for example, the IBM Tivoli Workload Scheduler (TWS) by IBM Corporation—trademarks) runs on the control server, for controlling the execution of batches of jobs on corresponding execution servers.

For this purpose, the scheduler 400 comprises a configurator 405 (such as the Composer module of the IBM TWS), which is used to maintain a workload database 410 (written in a suitable control language—for example, XML-based). The workload database 410 contains a definition of all the execution servers that are available to the scheduler 400; for example, each execution server is defined by an identifier for accessing it (such as its host name and IP address), together with corresponding physical/logical characteristics (such as processing power, memory size, operating system, and the like).

The workload database 410 also comprises a job descriptor of each job. The job descriptor specifies the software programs to be invoked (with their arguments and environmental variables); typically, the job involves the running of a batch (i.e., non-interactive) software program (for example, a payroll application). Moreover, the job descriptor defines an execution policy of the job. Particularly, the execution policy indicates the execution servers on which the job may be executed, either statically (by their identifiers) or dynamically (by their characteristics). The execution policy then indicates the execution time of the job, which defines when it should be submitted for execution; for example, the execution time may be defined by the date and the hour of the day, with a possible run-cycle thereof (indicating when the execution of the job is to be repeated, for example, every day, week or month). The execution policy also indicates possible constraints for the execution of the job. Particularly, the constraints may limit when the job is executed (for example, an earliest time or a latest time, or a maximum allowable duration), may identify resources that are required for the execution of the job (such as specific software programs), may require the entering of information for enabling the execution of the job, and/or may specify activities that are to be performed before the execution of the job (for example, the completion of other jobs). In the context of the present disclosure, the constraints of interest are the above-mentioned dependencies (each one defined by the dependency type and the dependency time of the predecessor job, and by the job name and the execution time of the successor job). The workload database 415 also stores statistic information relating to previous executions of the jobs (such as a log of their duration from which a corresponding estimated duration for next executions thereof may be inferred).

A planner 415 (such as the Master Domain Manager module in the IBM TWS) is used to create a plan, whose definition is stored in a control file 420 (such as the Symphony file in the IBM TWS). The plan specifies the flow of execution of a batch of jobs in a specific production period (typically, one day), together with the definition of the corresponding execution servers. A new plan is generally created automatically before every production period. The planner 415 creates the plan by adding the jobs to be executed in the next production period, and by removing the jobs of the previous production period that have been completed; in addition, the jobs of the previous production period that did not complete successfully or that are still in execution or waiting to be executed may be maintained in the plan (for their execution during the next production period). For this purpose, the planner 415 processes the information available in the workload database 410 so as to select the jobs to be executed; the planner 415 resolves the corresponding dependencies and then arranges the jobs in the desired sequence (according to their expected duration and constraints, comprising the dependencies). In the solution according to an embodiment of the present disclosure, in order to resolve the dependencies the planner 415 controls the job list (of the ordered jobs) that is stored in a corresponding file 425 and the dependency list (of the ordered dependencies) that is stored in a corresponding file 430.

A handler 435 (such as the Batchman module in the IBM TWS) extracts the plan from the control file 420 and starts it at the beginning of every production period. The handler 435 submits each job for execution as soon as possible on the corresponding execution server (as indicated by its identifier or selected at run-time among the available ones having the required characteristics, for example, according to information provided by a load balancer not shown in the figure).

The actual execution of the jobs is managed by an executor 440 (such as the Jobman module in the IBM TWS); for this purpose, the executor 440 interfaces with an execution agent running on each execution server (not shown in the figure). The execution agent enforces the execution of each job in response to a corresponding command received from the executor 440, and it returns feedback information relating to the result of its execution (for example, whether the job has been completed successfully, its actual duration, and the like). The feedback information of each executed job is passed by the executor 440 to the handler 435, which enters it into the control file 420 (so as to provide a real-time picture of the current state of all the jobs of the plan). At the end of the production period, the planner 415 extracts the feedback information of all the executed jobs from the control file 420, and it updates the corresponding statistic information in the workload database 410 accordingly.

Figure 5A:
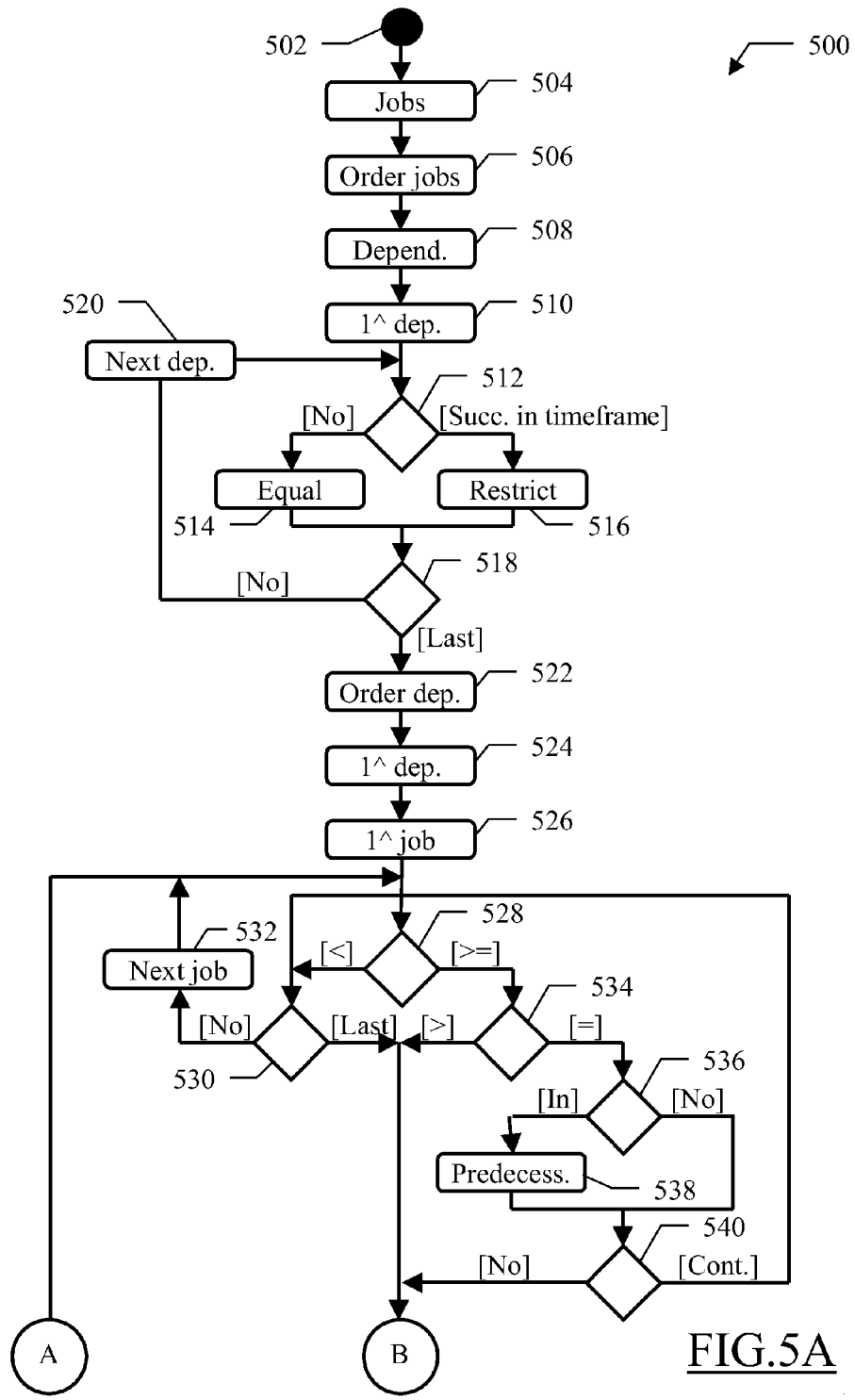
FIG. 5A-FIG. 5C show an activity diagram describing the flow of activities relating to an implementation of the solution according to an embodiment of the present disclosure.
Figure 5B:
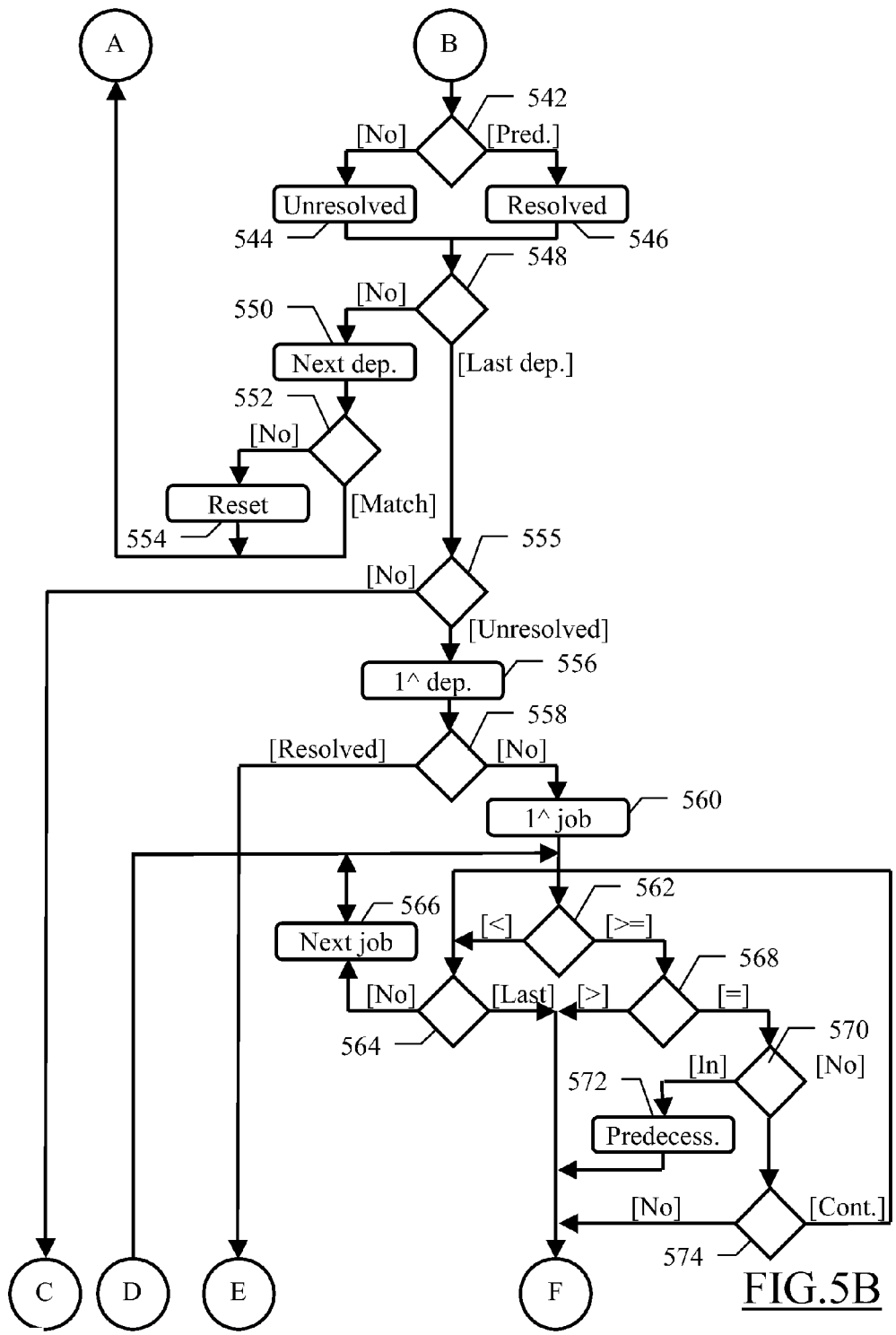
Figure 5C:
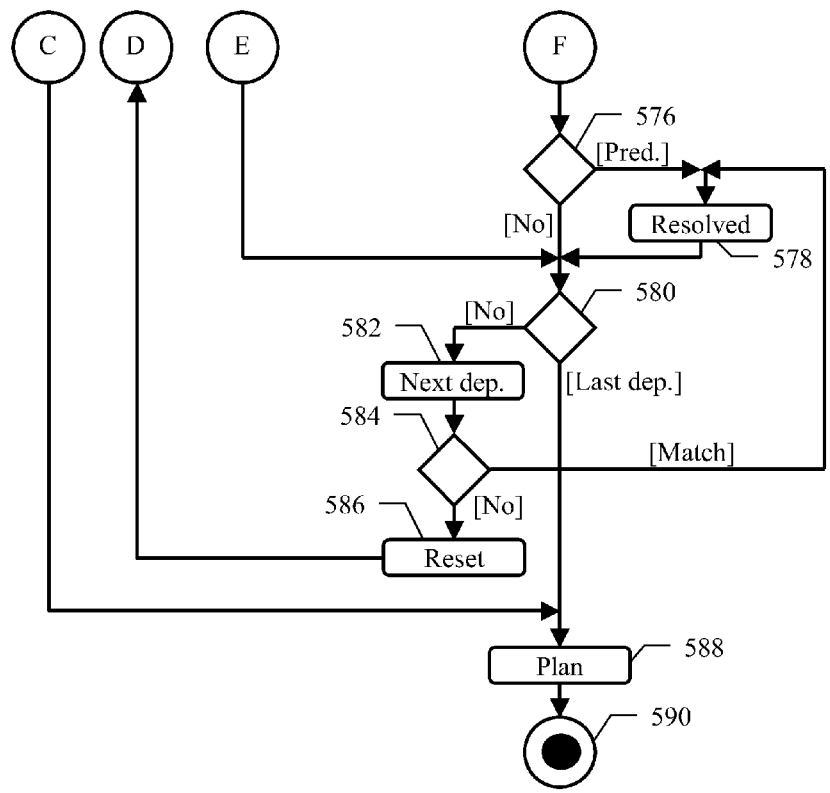

With reference now to the FIG. 5A-FIG. 5C, an activity diagram is shown describing the flow of activities relating to an implementation of the solution according to an embodiment of the present disclosure.

Particularly, the diagram represents an exemplary process that may be used to resolve the dependencies with a method 500. In this respect, each block may represent one or more executable instructions for implementing the specified logical function on the execution server.

More in detail, the process starts at the black start circle 502, and then passes to block 504 wherein an indication of the jobs to be executed is received (for example, extracted from the workload database), with each job identified at least by its job name and execution time. Continuing to block 506, the jobs are ordered into the job list by the job name (for example, in alphabetic order) and then by the execution time for the same job name (for example, in ascending order of time).

Likewise, an indication of the dependencies is received at block 508 (for example, again extracted from the workload database), with each dependency identified at least by the dependency type and dependency timeframe of its predecessor job, and by the job name and execution time of its successor job. A loop is then entered at block 510 for defining the backward timeframe of each dependency, starting from the first one. Continuing to block 512, a test is made to verify whether in a (current) dependency the execution time of the successor job falls within the dependency timeframe. If not, the backward timeframe is set equal to the dependency timeframe at block 514; conversely, the backward timeframe is set equal to the dependency timeframe being restricted with the end time thereof equal to the execution time of the successor job at block 516. In both cases, the process descends into block 518, wherein a test is made to verify whether a last dependency has been processed. If not, the loop passes to a next dependency at block 520, and then returns to the block 512 to repeat the same operations on it. Conversely (once all the dependencies have been processed), the loop is exit by descending from the block 518 into block 522. At this point, the dependencies are ordered into the dependency list by the dependency name and then by the backward timeframe for the same dependency name, according to the same criteria being used for ordering the jobs (i.e., in alphabetic order and in ascending order of time, respectively).

Another loop is now entered at block 524 for implementing the look-backward scanning; for this purpose, the scanning of the dependency list starts from the first dependency. The scanning of the job list likewise starts from the first job at block 526. Continuing to block 528, a test is made to verify whether the job name of a current job precedes (<) the dependency name of a (current) dependency according to the corresponding ordering criterion (i.e., in alphabetic order). If so, a further test is made at block 530 to verify whether a last job has been reached. If not, the scanning passes to a next job at block 532, and then returns to the block 528 to repeat the same operations on it. Referring back to the block 528, if the job name of the current job does not precede (>=) the dependency name, the process descends into block 534; at this point, a test is made to verify whether the job name of the current job is equal to the dependency name. If so, another test is made at block 536 to verify whether the execution time of the current job falls within the backward timeframe. If so (meaning that the current job is eligible to be the predecessor job with its execution time before the one of the successor job), the predecessor job is set equal to the current job at block 538 (for example, by saving its job name and execution time into a predecessor variable, initialized to a null value). The process then continues to block 540; the same point is also reached directly from the block 536 if the execution time of the current job does not fall within the dependency timeframe. At this point, a test is made to verify whether the execution time of the current job follows (>) the end time of the backward timeframe or the execution time of the successor job according to the corresponding ordering criterion (i.e., in ascending order of time). If none of these conditions is satisfied, the process returns to the block 530 (so as to pass to a next job if possible). Conversely, the process descends into block 542; the same point is also reached from the block 530 (if the last job has been reached) or from the block 534 (if the job name of the current job follows the dependency name). In this condition, no possibilities exist of finding any further eligible job; indeed, all the jobs have been processed (from the block 530), no further job may have the job name equal to the dependency name (from the block 534) or no further job may have the execution time within the backward timeframe before the execution time of the successor job (from the block 540). Therefore, the scanning of the jobs is stopped, and a test is made to verify whether any predecessor job has been found (i.e., the predecessor variable is not null). If not, the dependency is marked as unresolved at block 544 (for example, by deasserting a corresponding resolution flag); at the same time, an unresolved flag for all the dependencies (initially deasserted) is asserted to indicate that at least one dependency has not been resolved during the look-backwards scanning. Conversely, the dependency is resolved at block 546 by linking the predecessor job indicated in the predecessor variable (i.e., the last one being found, and then having the execution time closest to the execution time of the successor job) to the successor job, with the corresponding resolution flag that is asserted. In both cases, a test is made at block 548 to verify whether a last dependency has been reached. If not, the scanning passes to a next dependency at block 550. A test is then made at block 552 to verify whether the predecessor job of the previous dependency (if any, as indicated in the predecessor variable) is eligible to be the predecessor job of the (new current) dependency as well (i.e., its job name is equal to the dependency name and its execution time falls within the backward timeframe). If not, the predecessor variable is reset to the null value at block 554 (whereas otherwise no operation is performed so as to leave the predecessor variable unaffected). The process then returns from the block 552 or from the block 554 to the block 528 to repeat the same operations on this dependency (with the predecessor variable possibly already set). Conversely (once all the dependencies have been processed), the loop is exit by descending from the block 548 into block 555.

At this point, a test is made to verify if at least one dependency has not been resolved during the look-backward scanning. If so (i.e., the unresolved flag is asserted), a further loop is entered at block 556 for implementing the look-forward scanning; for this purpose, the scanning of the dependency list again starts from the first dependency. A test is then made at block 558 to verify whether a (current) dependency has already been resolved (as indicated by the corresponding resolution flag). If not (i.e., the resolution flag is deasserted), the scanning of the job list likewise starts from the first job at block 560. Continuing to block 562, a test is made to verify whether the job name of a current job precedes (<) the dependency name according to the corresponding ordering criterion (i.e., in alphabetic order). If so, a further test is made at block 564 to verify whether a last job has been reached. If not, the scanning passes to a next job at block 566, and then returns to the block 562 to repeat the same operations on it. Referring back to the block 562, if the job name of the current job does not precede (>=) the dependency name, the process descends into block 568; at this point, a test is made to verify whether the job name of the current job is equal to the dependency name. If so, another test is made at block 570 to verify whether the execution time of the current job falls within the dependency timeframe. If so, the predecessor job is set equal to the current job at block 572 (for example, again by saving its job name and execution time into the predecessor variable, initialized to a null value). Conversely, a test is made at block 575 to verify whether the execution time of the current job follows (>) the end time of the dependency timeframe according to the corresponding ordering criterion (i.e., in ascending order of time). If not, the process returns to the block 564 (so as to pass to a next job if possible). Conversely, the process descends into block 576; the same point is also reached from the block 564 (if the last job has been reached), from the block 568 (if the job name of the current job follows the dependency name) or from the block 572 (if the predecessor job has been found). In this condition, the predecessor job has been found (from the block 572) or no possibilities exist of finding the predecessor job; indeed, all the jobs have been processed (from the block 564), no further job may have the job name equal to the dependency name (from the block 568) or no further job may have the execution time within the dependency timeframe (from the block 574). Therefore, the scanning of the jobs is stopped, and a test is made to verify whether the predecessor job has been found (i.e., the predecessor variable is not null). If so, the dependency is resolved at block 578 by linking the predecessor job indicated in the predecessor variable (i.e., the first one being found, and then having the execution time closest to the execution time of the successor job) to the successor job, with the corresponding resolution flag that is asserted; conversely, no operation is performed so as to leave the dependency definitively unresolved (as indicated by the corresponding resolution flag that remains deasserted). The process then passed from the block 576 or from the block 578 to block 580; the same point is also reached directly from the block 558 when the dependency was already been resolved during the look-backward scanning (i.e., the corresponding resolution flag is asserted). At this point, a test is made to verify whether a last dependency has been reached. If not, the scanning passes to a next dependency at block 582. A test is then made at block 584 to verify whether the predecessor job of the previous dependency (if any, as indicated in the predecessor variable) is the predecessor job of the (new current) dependency as well (i.e., its job name is equal to the dependency name and its execution time falls within the dependency timeframe). If so, the process returns to the block 578 (so that this dependency as well is resolved by linking the same predecessor job indicated in the predecessor variable to the successor job, with the resolution flag that is asserted). Conversely, the predecessor variable is reset to the null value at block 586. The process then returns to the block 562 to repeat the same operations on this dependency. Conversely (once all the dependencies have been processed), the loop is exit by descending from the block 580 into block 588; the same point is also reached directly from the block 555 when all the dependencies have been resolved during the look-backward scanning (i.e., the unresolved flag is deasserted), so that the look-forward scanning is skipped at all. The plan is now created according to the resolved dependencies (as indicated by their resolution flags), with the successor job of any unresolved dependency that is instead excluded from it. The process then ends at the concentric white/black stop circles 590.

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), and the term a/an should be intended as one or more items (unless expressly indicated otherwise).

For example, an embodiment provides a computer-implemented method for planning execution of a plurality of tasks. The method comprises the following steps. An indication of the tasks is received; the indication of the tasks comprises, for each one of the tasks, an indication of a task type and an indication of an execution time. The tasks are ordered into a task list according to a primary ordering criterion based on the task type and to a secondary ordering criterion based on the execution time. An indication of the dependencies is received; the indication of the dependencies comprises, for each one of the dependencies, an indication of a dependency type for the task type and an indication of a dependency time for the execution time of a predecessor one of the tasks enabling the execution of a successor one of the tasks. The dependencies are ordered into a dependency list according to the primary ordering criterion based on the dependency type and to the secondary ordering criterion based on the dependency time. The dependency list is scanned (starting from a beginning thereof) for resolving each current one of the dependencies. For this purpose, the task list is scanned (starting from a beginning thereof for a first one of the dependencies and from a point being reached for a previous one of the dependencies otherwise) for identifying the predecessor task; the predecessor task is identified as a current one of the tasks having the task type meeting the dependency type and the execution time meeting the dependency time. The execution of the tasks is planned according to the resolved dependencies.

However, the planning of the task may be performed at any time (for example, for creating a new plan or for updating an existing one). The tasks may be of any type (see below) and in any number. The indication of the tasks may be received in any way (for example, in the form of a plan to be updated). The task type may be indicated in any way (for example, by a category of the tasks); likewise, the execution time may be indicated in any way (for example, by the time of a single occurrence, by a simple date or hour). The primary and secondary ordering criteria may be of any type (for example, in inverse alphabetic order and in decreasing order of time, respectively); the tasks and the dependencies may be ordered in any way in the corresponding lists (for example, physically with files or logically with pointers). The indication of the dependencies may be received in any way (for example, read from a dedicated file). The dependency type may be indicated in any way (for example, with wildcard characters for the task type); likewise, the dependency time may be indicated in any way (see below). The ordering of the dependencies may be based in any way on the dependency type (for example, excluding any wildcard characters) and on the dependency time (see below). The dependency list and the task list may be scanned in any way (see below). The execution of the tasks may be planned in any way according to the resolved dependencies (for example, by providing a warning when one or more dependencies are unresolved).

In an embodiment, each dependency time is a dependency timeframe defined by a start time and an end time; the dependencies are ordered according to the secondary ordering criterion based on the end time and on the start time subordinately to the end time.

However, the ordering of the dependencies may be based in any way on the dependency timeframe (for example, on the start time and subordinately on the end time when the secondary ordering criterion is in descending order of time). In any case, the dependency timeframe may be defined in any other way, even without the start time and/or the end time (for example, any time preceding or following the execution time of the successor task, any time within the same day of the execution time of the successor task); more generally, the dependency time may be of any type (for example, outside a time interval, or an exact instant).

In an embodiment, the step of scanning comprises identifying the predecessor task of each current dependency as the current task, which has the task type meeting the dependency type, and the execution time meeting the dependency time and not following the execution time of the successor task.

However, the predecessor task may be selected in any way, even independently of its relationship with the execution time of the successor task (for example, simply as the closest one, either before or after it).

In an embodiment, the method further comprises determining a backward time from the dependency time of each dependency; the backward time is determined by setting the backward time equal to the dependency time when the execution time of the successor task does not meet the dependency time or equal to the dependency time being restricted according to the execution time of the successor task otherwise. The dependencies are ordered according to the secondary ordering criterion based on the backward time; the predecessor task is identified as the current task having the task type meeting the dependency type and the execution time meeting the backward time.

However, the backward time may be restricted in any other way (for example, by setting its start time equal to the execution time of the successor task when the secondary ordering criterion is in descending order of time); in any case, nothing prevents always using the dependency time, without determining any backward time.

In an embodiment, the step of scanning comprises identifying the predecessor task of each current dependency as the current task having the task type meeting the dependency type, and the execution time meeting the backward time and being closest to the execution time of the successor task.

However, the predecessor tasks may be selected among the eligible tasks in any other way (for example, according to additional characteristics thereof such as their execution location).

In an embodiment, the step of scanning comprises the following operations for each current dependency. The task list is scanned (for setting the predecessor task of the current dependency equal to the current task if the current task has the task type meeting the dependency type and the execution time meeting the backward time), until the task type of the current task follows the dependency type according to the primary ordering criterion or the execution time of the current task follows the backward time or the execution time of the successor task according to the secondary ordering criterion; the current dependency is determined as resolved if the predecessor task has been set or as unresolved otherwise.

However, any other algorithm may be implemented (for example, returning to a previous task after processing each dependency).

In an embodiment, the method further comprises the following step. The dependency list is further scanned (starting from the beginning thereof) for resolving each further current one of the dependencies that has not been resolved during said scanning by further scanning the task list (with the further scanning of the task list that starts from the beginning thereof for the first dependency and from a further point that has been reached for a further previous one of the dependencies otherwise); the task list is further scanned for identifying the predecessor task as a further current one of the tasks, which has the task type meeting the dependency type, and the execution time meeting the dependency time and following the execution time of the successor task.

However, nothing prevents performing a single scanning of the dependencies and the tasks (for example, when the dependency task is identified irrespectively of the execution time of the successor task).

In an embodiment, the step of further scanning comprises identifying the predecessor task of each current dependency as the further current task having the task type meeting the dependency type, and the execution time meeting the dependency time and being closest to the execution time of the successor task.

However, the predecessor tasks may be selected among the eligible tasks in any other way (for example, as above according to additional characteristics thereof such as their execution location).

In an embodiment, the step of further scanning comprises the following operations for each further current dependency. The task list is further scanned (for setting the predecessor task of the further current dependency equal to the further current task if the further current task has the task type meeting the dependency type and the execution time meeting the dependency time), until the task type of the further current task follows the dependency type according to the primary ordering criterion, the execution time of the further current task follows the dependency time according to the secondary ordering criterion, or the further current dependency has been resolved.

However, any other algorithm may be implemented (for example, returning to a previous task after processing each dependency).

In an embodiment, the tasks are instances of jobs to be scheduled for execution on the data-processing system.

However, the jobs may be of any type (for example, interactive software programs, web services, or even job streams each one consisting of an ordered sequence of logically related jobs that should be executed as a single work unit). In any case, the same technique may be applied for planning the execution of whatever tasks in the broadest meaning of the term (for example, for monitoring the availability of data-processing resources that are required for enabling the execution of other tasks, for provisioning the data-processing resources); moreover, the tasks may be executed in any data-processing system (for example, a pool of server farms, a cloud environment) or even independently of it (for example, for controlling the landing and taking off of airplanes).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment provides a computer program for causing a data-processing system to perform the steps of the above-mentioned method when the computer program is executed on the data-processing system.

A further embodiment provides a computer program product comprising a non-transitory computer readable medium embodying a computer program, the computer program comprising code directly loadable into a working memory of a data-processing system thereby configuring the data-processing system to perform the same method.

However, the above-described solution may be implemented as a stand-alone module, as a plug-in for a control program (such as the scheduler), or even directly in the control program. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A further embodiment provides a system comprising means for performing the steps of the above-described method.

However, this method may also be carried out on a system based on a different architecture (for example, a local, wide area, global, cellular or satellite network), and exploiting any type of (wired and/or wireless) connections. However, its implementation on a stand-alone computer is not excluded.

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The invention claimed is:

1. A computer-implemented method for planning execution of a plurality of tasks according to a plurality of dependencies, the method comprising:
receiving an indication of the tasks comprising, for each one of the tasks, an indication of a task type and an indication of an execution time;
ordering the tasks into a task list according to a primary ordering criterion based on the task type and to a secondary ordering criterion based on the execution time;
receiving an indication of the dependencies comprising, for each one of the dependencies, an indication of a dependency type for the task type and an indication of a dependency time for the execution time of a predecessor one of the tasks enabling the execution of a successor one of the tasks;
ordering the dependencies into a dependency list according to the primary ordering criterion based on the dependency type and to the secondary ordering criterion based on the dependency time;
scanning the dependency list starting from a beginning thereof for resolving each current one of the dependencies by scanning the task list, starting from a beginning thereof for a first one of the dependencies and from a point being reached for a previous one of the dependencies otherwise, for identifying the predecessor task as a current one of the tasks having the task type meeting the dependency type and the execution time meeting the dependency time; and
planning the execution of the tasks according to the resolved dependencies.

2. The method according to claim 1, wherein each dependency time is a dependency timeframe defined by a start time and an end time, the dependencies being ordered according to the secondary ordering criterion based on the end time and on the start time subordinately to the end time.

3. The method according to claim 1, wherein said scanning comprises:
identifying the predecessor task of each current dependency as the current task having the task type meeting the dependency type, and the execution time meeting the dependency time and not following the execution time of the successor task.

4. The method according to claim 3, further comprising:
determining a backward time from the dependency time of each dependency by setting the backward time equal to the dependency time when the execution time of the successor task does not meet the dependency time or equal to the dependency time being restricted according to the execution time of the successor task otherwise, the dependencies being ordered according to the secondary ordering criterion based on the backward time and the predecessor task being identified as the current task having the task type meeting the dependency type and the execution time meeting the backward time.

5. The method according to claim 4, wherein said scanning comprises:
identifying the predecessor task of each current dependency as the current task having the task type meeting the dependency type, and the execution time meeting the backward time and being closest to the execution time of the successor task.

6. The method according to claim 5, wherein said scanning comprises, for each current dependency:
scanning the task list for setting the predecessor task of the current dependency equal to the current task if the current task has the task type meeting the dependency type and the execution time meeting the backward time, until the task type of the current task follows the dependency type according to the primary ordering criterion or the execution time of the current task follows the backward time or the execution time of the successor task according to the secondary ordering criterion; and
determining the current dependency as resolved if the predecessor task has been set or as unresolved otherwise.

7. The method according to claim 3, further comprising:
further scanning the dependency list starting from the beginning thereof for resolving each further current one of the dependencies being not resolved during said scanning by further scanning the task list, starting from the beginning thereof for the first dependency and from a further point being reached for a further previous one of the dependencies otherwise, for identifying the predecessor task as a further current one of the tasks having the task type meeting the dependency type, and the execution time meeting the dependency time and following the execution time of the successor task.

8. The method according to claim 7, wherein said further scanning comprises:
identifying the predecessor task of each current dependency as the further current task having the task type meeting the dependency type, and the execution time meeting the dependency time and being closest to the execution time of the successor task.

9. The method according to claim 8, wherein said further scanning comprises, for each further current dependency:
further scanning the task list, for setting the predecessor task of the further current dependency equal to the further current task if the further current task has the task type meeting the dependency type and the execution time meeting the dependency time, until the task type of the further current task follows the dependency type according to the primary ordering criterion, the execution time of the further current task follows the dependency time according to the secondary ordering criterion or the further current dependency has been resolved.

10. The method according to claim 1, wherein the tasks are instances of jobs to be scheduled for execution on the data-processing system.

11. A computer program product comprising a non-transitory computer readable storage medium embodying a computer program, the computer program comprising code directly loadable into a working memory of a data-processing system thereby configuring the data-processing system to perform the method of claim 1.

12. A data processing system comprising a data processor coupled to a memory having program code stored therein that is operable, when executed by the data processor, to perform the method of claim 1.

* * * * *